(12) United States Patent
Arias Macias et al.

(10) Patent No.: US 12,024,332 B2
(45) Date of Patent: Jul. 2, 2024

(54) LABEL BOX

(71) Applicant: KHS GmbH, Dortmund (DE)

(72) Inventors: Diego Francisco Arias Macias, Dortmund (DE); Matthias Jansen, Essen (DE); Florian Dieckmann, Lünen (DE); Thomas Stienen, Unna (DE)

(73) Assignee: KHS GmbH, Dortmund (DE)

( * ) Notice: Subject to any disclaimer, the term of this patent is extended or adjusted under 35 U.S.C. 154(b) by 429 days.

(21) Appl. No.: 17/049,369

(22) PCT Filed: May 9, 2019

(86) PCT No.: PCT/EP2019/061893
§ 371 (c)(1),
(2) Date: Oct. 21, 2020

(87) PCT Pub. No.: WO2019/215270
PCT Pub. Date: Nov. 14, 2019

(65) Prior Publication Data
US 2021/0245912 A1    Aug. 12, 2021

(30) Foreign Application Priority Data
May 11, 2018   (DE) .......................... 102018111315.3

(51) Int. Cl.
*B65C 9/10*   (2006.01)
*B29C 64/386*   (2017.01)
(Continued)

(52) U.S. Cl.
CPC .............. *B65C 9/10* (2013.01); *B29C 64/386* (2017.08); *B33Y 10/00* (2014.12); *B33Y 30/00* (2014.12);
(Continued)

(58) Field of Classification Search
CPC ......... B33Y 10/00; B33Y 30/00; B33Y 50/02; B33Y 70/00; B33Y 80/00; B29C 64/386;
(Continued)

(56) References Cited

U.S. PATENT DOCUMENTS

| 3,043,588 A * | 7/1962 | Carter ....................... B65C 9/10 |
| | | 156/DIG. 29 |
| 2008/0006273 A1* | 1/2008 | Thornton .............. B29C 64/386 |
| | | 700/182 |

(Continued)

FOREIGN PATENT DOCUMENTS

| CN | 2656306 Y | 11/2004 |
| CN | 103317846 A | 9/2013 |

(Continued)

OTHER PUBLICATIONS

Reiher—Reiher, Product Optimization with and for Additive Manufacturing, University of Texas, 2016 (Accessed Nov. 14, 2022), http://utw10945.utweb.utexas.edu/sites/default/files/2016/179-Reiher.pdf (Year: 2016).*

*Primary Examiner* — Philip C Tucker
*Assistant Examiner* — Andrew L Swanson
(74) *Attorney, Agent, or Firm* — Occhiuti & Rohlicek LLP

(57) ABSTRACT

A label box includes a dispensing region and a storage region for holding a stack of labels, all of which have the same two-dimensional contour. The dispensing region includes a guiding-and-holding body that has been manufactured by an additive-manufacturing process based on a three-dimensional computer model thereof. The guiding-and-holding body forms a guide space for receiving and guiding of the stack and for dispensing the labels. The guide space includes a guide section that is adjustable to conform to the contour. The guiding-and-holding body also includes (Continued)

a securing region for at least partially securing the label box to a holding device.

23 Claims, 14 Drawing Sheets

(51) Int. Cl.
*B33Y 10/00* (2015.01)
*B33Y 30/00* (2015.01)
*B33Y 50/02* (2015.01)
*B33Y 70/00* (2020.01)
*B33Y 80/00* (2015.01)

(52) U.S. Cl.
CPC .............. *B33Y 50/02* (2014.12); *B33Y 70/00* (2014.12); *B33Y 80/00* (2014.12); *B65H 2402/80* (2013.01); *B65H 2404/74* (2013.01); *B65H 2701/192* (2013.01); *B65H 2801/75* (2013.01)

(58) Field of Classification Search
CPC .... B29C 64/393; B65C 9/10–105; B65C 3/16
See application file for complete search history.

(56) References Cited

U.S. PATENT DOCUMENTS

| | | | |
|---|---|---|---|
| 2009/0101271 A1 | 4/2009 | Ishida | |
| 2018/0319086 A1* | 11/2018 | Klammer | .............. B29C 64/386 |

FOREIGN PATENT DOCUMENTS

| | | | | |
|---|---|---|---|---|
| CN | 103473021 A | 12/2013 | | |
| DE | 1962943 A1 * | 6/1971 | .............. | B65C 9/10 |
| DE | 1962943 A1 | 6/1971 | | |
| DE | 8527708 U1 | 12/1985 | | |
| DE | 19811542 A1 * | 9/1999 | .............. | B65C 3/16 |
| DE | 112015002058 T5 | 1/2017 | | |
| DE | 202016105825 U1 | 1/2018 | | |
| EP | 0449149 A2 * | 3/1991 | .............. | B65C 9/10 |
| EP | 0449149 A2 | 10/1991 | | |
| EP | 449149 B1 * | 10/1993 | .............. | B65C 9/10 |
| EP | 2641661 A1 | 9/2013 | | |
| KR | 20020004515 A | 1/2002 | | |
| WO | 2015/164954 A1 | 11/2015 | | |

* cited by examiner

LABEL BOX

RELATED APPLICATIONS

This is the national stage of international application PCT/EP2019/061893, filed on May 2, 2019, which claims the benefit of the May 11, 2018 priority date of German application 102018111315.3, the contents of both of which are incorporated herein by reference.

FIELD OF INVENTION

The invention relates to container packaging, and in particular, to labeling containers.

BACKGROUND

Label boxes for a label stack in a label station typically include a removal element arranged such as to rotate or pivot on a circulating carrier that can be rolled with a convex-curved glue palette and that can be provided with glue in a glue application device, on the face side of the label stack.

With high-capacity labelling machines, in particular those with a capacity of more than 10,000, and preferably more than 50,000 containers per hour, such a label box can be configured to move forwards and backwards. It is therefore possible to control the removal of the labels from the label stack and the transfer of the labels onto the object to be labelled. This control usually includes making sure that no label is removed if there is no object to label. Removing a label under such circumstances could lead to disruptions in the further label removal and transfer.

Various different structural forms of label boxes are known. These typically comprise a storage region that stores labels and a dispensing region that dispenses labels one label at a time to the removal element.

SUMMARY

In one aspect, the invention features a label box comprising a dispensing region and a storage region for holding a stack of labels, all of which have the same two-dimensional contour. The dispensing region comprises a guiding-and-holding body that has been manufactured by an additive-manufacturing process based on a three-dimensional computer model thereof, the model having been generated based on the contour. The guiding-and-holding body forms a guide space for receiving the stack and guiding the labels during the label dispensing process. The guide space comprises a guide section that is adjustable to conform to the contour. The guiding-and-holding body also includes securing region for at least partially securing the label box to a holding device.

In another aspect, the invention relates to a label box comprising at least one dispensing region and one storage region, for holding at least one label stack formed from individual labels. In addition to this, in the label box, in the dispensing region at least one guiding-and-holding body is provided, which forms a guide space for at least partially receiving and laterally guiding the label stack and dispensing individual labels. In this case, the guide space is adapted at least partially to the two-dimensional contour of an individual label and comprises at least one fastening region for the at least partial fastening of the label box to a holding device. The guiding-and-holding body is produced by an additive manufacturing process, and specifically based on a three-dimensional computer model of the guiding-and-holding body which is produced as a dependency of the two-dimensional contour of an individual label.

According to an advantageous embodiment, provision is made in this situation for the guiding-and-holding body to be formed, on the basis of the additive manufacturing method, by one or more monolithic parts.

According to a further advantageous embodiment, provision is made for the guiding-and-holding body for the lateral guiding of the label stack to comprise a guide section, along which the individual labels of the label stack are guided with their outer contour being gripped, preferably over their full circumference.

According to a further advantageous embodiment, provision is made for the guiding section to be formed in the guide space, and adjusted at least in sections to the two-dimensional contour of an individual label.

According to a further advantageous embodiment, provision is made for the guide section to be formed as one piece, preferentially monolithic, with the guiding-and-holding body, and produced by an additive manufacturing method.

According to a further advantageous embodiment, provision is made for at least one guiding element to be provided in the region of the guiding section, which is arranged at the guiding section, or the guiding section is configured as at least one guiding element.

According to a further advantageous embodiment, provision is made for the at least one guiding element is formed as one part, in particular monolithic, with the guiding-and-holding body in the region of the guide section, and is produced by an additive production process.

According to a further advantageous embodiment, provision is made for the at least one guiding element is produced from an elastically deformable material and/or is connected by one end in an elastically movable manner to the guiding-and-holding body, while the other end, opposite the one end, is loose.

According to a further advantageous embodiment, provision is made for at least one setting screw to be provided in the region of the loose end at the guiding-and-holding body in such a way that, by the setting screw, the relative distance interval between the two-dimensional outer contour of the individual labels of the label stack to the guiding element can be adjusted.

According to a further advantageous embodiment, provision is made for at least one receiver for the at least one guiding element to be produced in the guiding-and-holding body by an additive production process.

According to a further advantageous embodiment, provision is made that, at the at least one guiding element, a wear layer is provided, which exhibits a different color to the other guiding and holding bodies.

According to a further advantageous embodiment, provision is made for a guiding section to be provided, extended and tapering from the storage region in the opposite direction along a longitudinal axis, at the free face side of which provision is made for retaining fingers, configured as being of one piece with the guiding-and-holding body, and provided for the individual labels of the label stack.

According to a further advantageous embodiment, provision is made for the guiding-and-holding body to comprise several openings and to exhibit a rod-shaped structure.

According to a further advantageous embodiment, provision is made for the guiding-and-holding body to comprise in the region of its underside at least one fastening region, produced as one piece by an additive production process, for fastening the label box to the holding device.

According to a further advantageous embodiment, provision is made for the guiding-and-holding body to comprise in the region of its upper side at least one receiving region, produced as one piece and by an additive production process, for fastening a further label box to the guiding-and-holding body.

According to a further advantageous embodiment, provision is made for the guiding-and-holding body to be configured as of two levels for the receiving and laterally guiding of two label stacks which can be arranged above one another, as well as for the dispensing of individual labels.

According to a further advantageous embodiment, provision is made for at least one shim to be provided at the guiding-and-holding body, in the region of the underside, which can be adjusted by an additive production method and exhibits a thickness, which is formed between the respective fastening region and the guiding-and-holding body.

According to a further advantageous embodiment, provision is made that in the storage region at least one label trough is provided, produced by an additive production method.

According to a further aspect, the present invention also relates to a method for the at least partial production of a label box, comprising at least one dispensing region and a storage region for holding at least one label stack formed from individual labels, and comprising at least the following method steps: wherein at least one two-dimensional model of the contour is prepared from contour data representing an individual label, wherein, starting from the contour data, a three-dimensional computer model of at least one guiding-and-holding body is produced, wherein, based on the three-dimensional computer model, a three-dimensional control data set is produced for a control routine which can be carried out in a control unit, for actuating a 3D printer, wherein the 3D printer is actuated as a dependency of the control routine carried out in the control unit, on the basis of the three-dimensional control data, and—wherein at least the guiding-and-holding body is printed as a 3D printed product by a 3D printer actuated in such a manner.

According to a further advantageous embodiment, provision is made that the contour data of the individual label is detected by an imaging detection unit.

According to a further advantageous embodiment, provision is made that the contour data of the individual label is provided stored on a data storage medium.

According to a further advantageous embodiment, provision is made that the three-dimensional computer model at least of the guiding-and-holding body is produced from the contour data by a computing unit.

According to a further advantageous embodiment, provision is made that the three-dimensional computer model of at least the guiding-and-holding body is produced software-based and/or partially automated, preferably fully automated.

According to a further advantageous embodiment, provision is made that the three-dimensional computer model at least of the guiding-and-holding body is produced by a program routine stored in the computing unit.

According to a further advantageous embodiment, provision is made that the contour data is stored in a construction databank deposited in the computing unit, and the three-dimensional computer model at least of the guiding-and-holding body is produced from the contour data deriving from the graphic objects represented by a display unit.

According to a further advantageous embodiment, provision is made that the three-dimensional computer model at least of the guiding-and-holding body is produced by the computing unit in such a way that the longitudinal extension of the guiding-and-holding body along the longitudinal axis is adjusted, software-based and/or automated, to the number of the individual labels of the label stack.

According to a further advantageous embodiment, provision is made that the control routine is carried out in at least one processor unit of the control unit, which is configured such that control data sets received at a first interface of the control unit are to be converted, by the control routine, into three-dimensional control data, or to define control commands, which by a second interface are to be transferred to the 3D printer, in order to actuate this as a dependency of the control data or control commands generated by the control routine.

According to a further aspect, the present invention also relates to a control data set, with a series of control instructions, wherein the control instructions are configured in such a way that, at implementation on a 3D printer, the 3D printer is caused to print a label box according to the invention, comprising at least one dispensing region and one storage region for receiving at least one label stack formed from individual labels.

The expression "essentially" or "approximately" signifies in the meaning of the invention deviations from the exact value in each case by +/−10%, preferably by +/−5%, and/or deviations in the form of changes which are not of significance for the function.

Further embodiments, advantages, and possible applications of the invention are also derived from the following description of exemplary embodiments and from the figures. In this situation, all the features described and/or represented as images are in principle the object of the invention, alone or in any desired combination, regardless of their summary in the claims or reference to them. The contents of the claims are also considered a constituent part of the claims.

BRIEF DESCRIPTION OF THE DRAWINGS

The invention is described in greater detail hereinafter on the basis of the figures in relation to exemplary embodiments.

FIG. 2b is a top view of the guiding-and-holding body shown in FIG. 2a;

FIG. 3b is a perspective view of the guiding-and-holding body according to FIG. 3a;

FIG. 5b is a view from above onto the guiding-and-holding body shown in FIG. 5a;

FIG. 6b is a side view of the guiding-and-holding body according to FIG. 6a;

For elements of the element which are the same or have the same effect, identical reference numbers are used in the Figures. In addition, for easier overview only reference numbers in the individual Figures are represented which are necessary for the description of the respective Figure.

DETAILED DESCRIPTION

Figure 1:
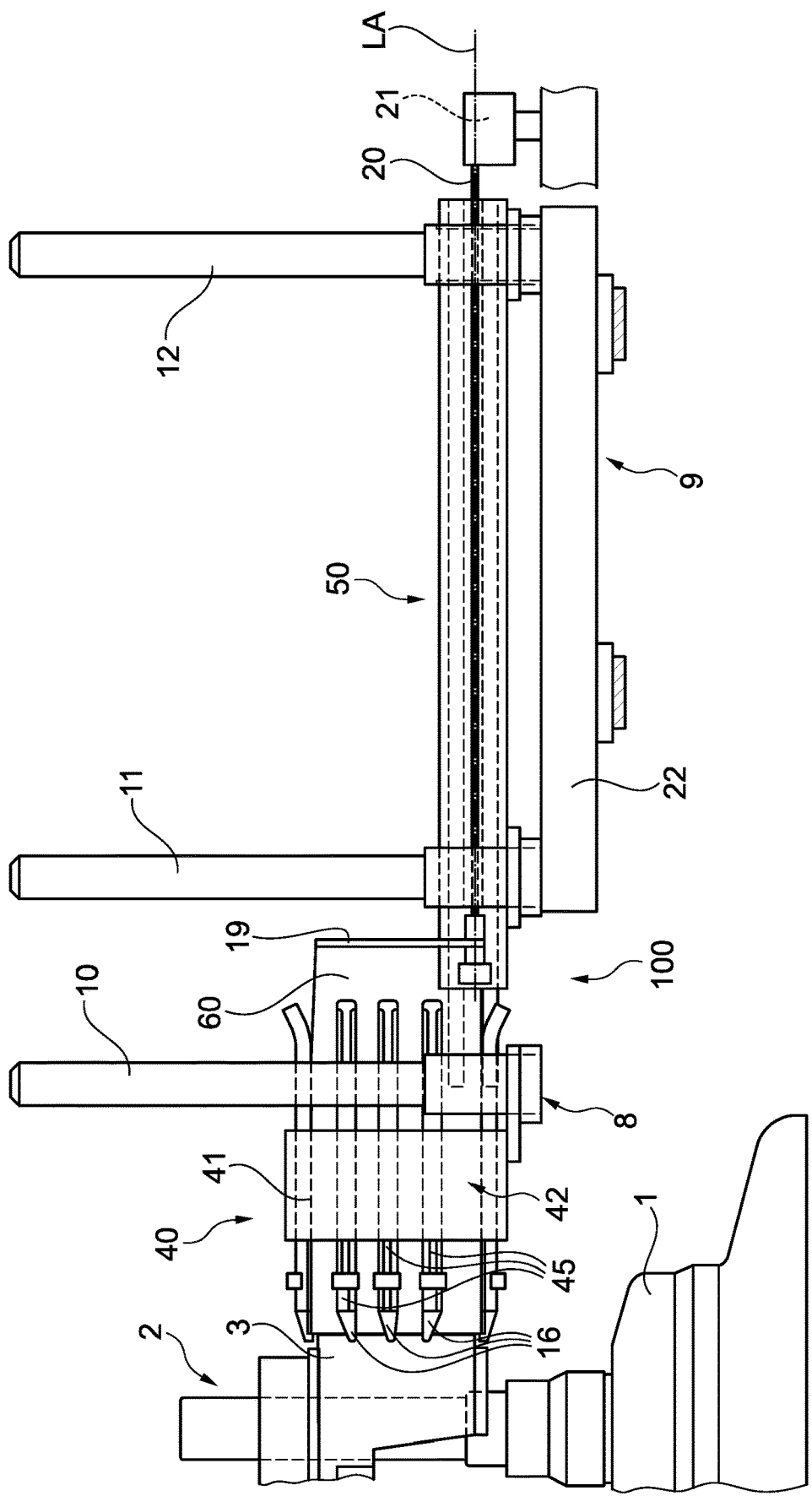
FIG. 1 shows a label box arranged in a labeling station.

FIG. 1 shows a label box 100 having a dispensing region 40 and a storage region 50. In some embodiments, the dispensing region 40 and the storage region 50 are formed as a single unit. In other embodiments, the dispensing region 40 and the storage region 50 are formed as individual units that have been joined together.

The label box 100 holds a stack 60 that has been formed from individual labels 61. In some embodiments, the labels 61 are single sheet labels. The stack 60 is thus a stack of labels 61, each of which has the same two-dimensional contour.

Within a labelling machine, a labeling station applies glue to individual labels that are stored in the label box 100 and transfers those labels, now having glue applied thereon, onto the objects which are to be labelled. Examples of such objects include bottles.

The various elements of a labelling station are arranged on a circulating carrier 1, which is seen in FIG. 1. These include rotating or oscillating removal elements 2 that are provided with glue palettes 3.

Each glue palette 3 has a convex surface for picking up glue. Loading a glue palette 3 with glue includes rolling this convex surface onto a glue roller. Having thus been loaded with glue, the glue palette 3 is rolled onto the face side of the stack 60 in the label box 100.

Within the dispensing region 40, the label box 100 includes a guiding-and-holding body 41. The guiding-and-holding body 41 forms a guide space 42 for at least partially receiving and laterally guiding the stack 60 and for dispensing the individual labels 61. To promote the lateral guiding of the stack 60, the guiding-and-holding body 41 includes a guiding section FA, best seen in FIG. 2a.

Figure 2A:
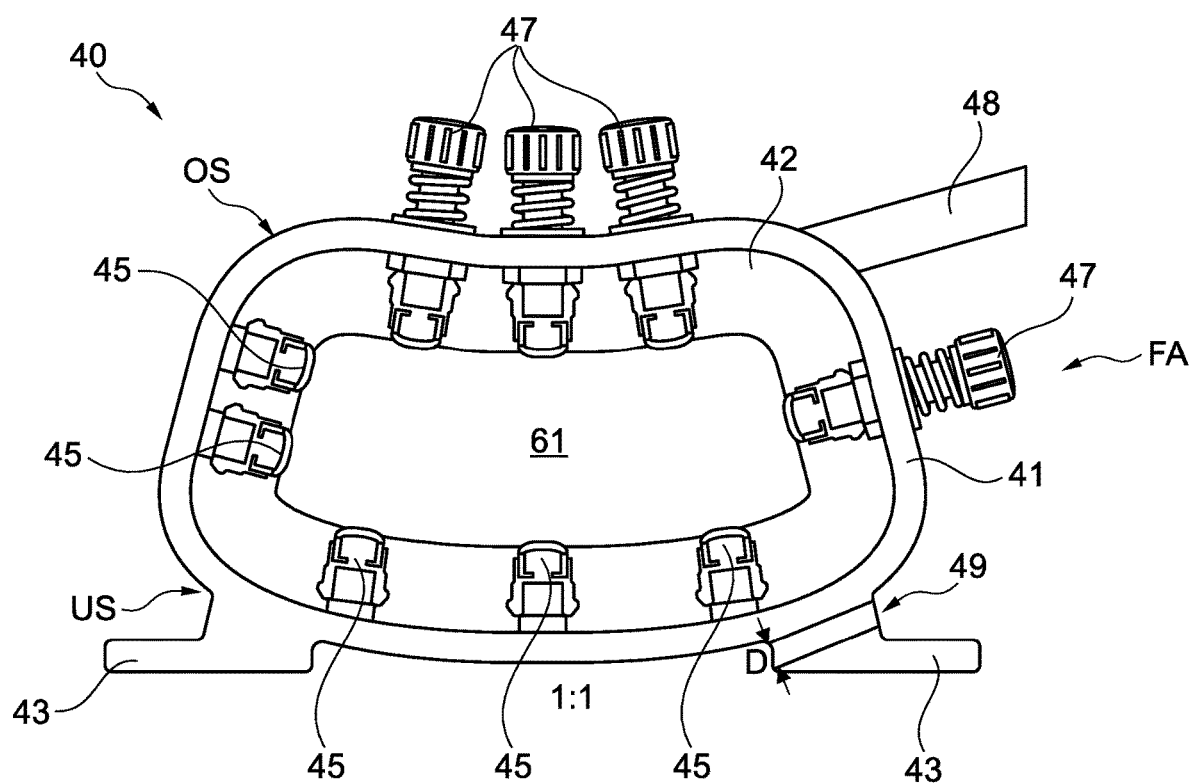
FIG. 2a shows a side view of a guiding-and-holding body from the label box shown in FIG. 1.

The guiding section FA guides the individual labels 61 of the label stack 60 by engaging the various points along the label's periphery, as shown in FIG. 2a. The guide space 42 is an empty space within the guiding-and-holding body 41. The cross-section of the guide space 42 includes a section that adjusts to the label's contour, or shape. Preferably, the guide section FA is configured to guide the label stack 60 on all sides.

In some embodiments, the guiding-and-holding body 41 is one that has been produced by additive manufacturing, and in particular, by a three-dimensional computer model of the guiding-and-holding body 41 that has been generated based on the two-dimensional contour of the individual label 61 that it is to guide. In some cases, the guiding-and-holding body 41 is one that has been formed as one monolithic part using the additive manufacturing process. In other cases, the guiding-and-holding body 41 is one that has been formed from two or more monolithic parts made by additive manufacturing and joined together after having been thus manufacture.

In some embodiments, the guiding and holding body 41 and the guide section FA are formed as a single monolithic piece. Alternatively, the guide section FA is formed as a single part that is separate from the guiding-and-holding body 41 but that is securely connected thereto by a mechanical fastener, such as by screws. Among these embodiments are those in which the guide section FA has also been manufactured by an additive manufacturing process.

Referring again to FIG. 2a, the guide section FA receives one or more guides 45 that protrude into the guide space 42. These guides 45 engage the periphery of a label 61 passing therethrough. The guides 45 are secured to the guide section FA. However, they are not permanently secured. Instead, the guides 45 are secured in a manner that permits detachment and, if necessary, replacement thereof.

In the particular embodiment shown, a set screw 47 provides a way to adjust the distance by which the guide 45 protrudes into the guide space 42. This provides a way to adjust the distance between the guide 45 and the periphery, or edge, of a label 61.

Figure 3A:
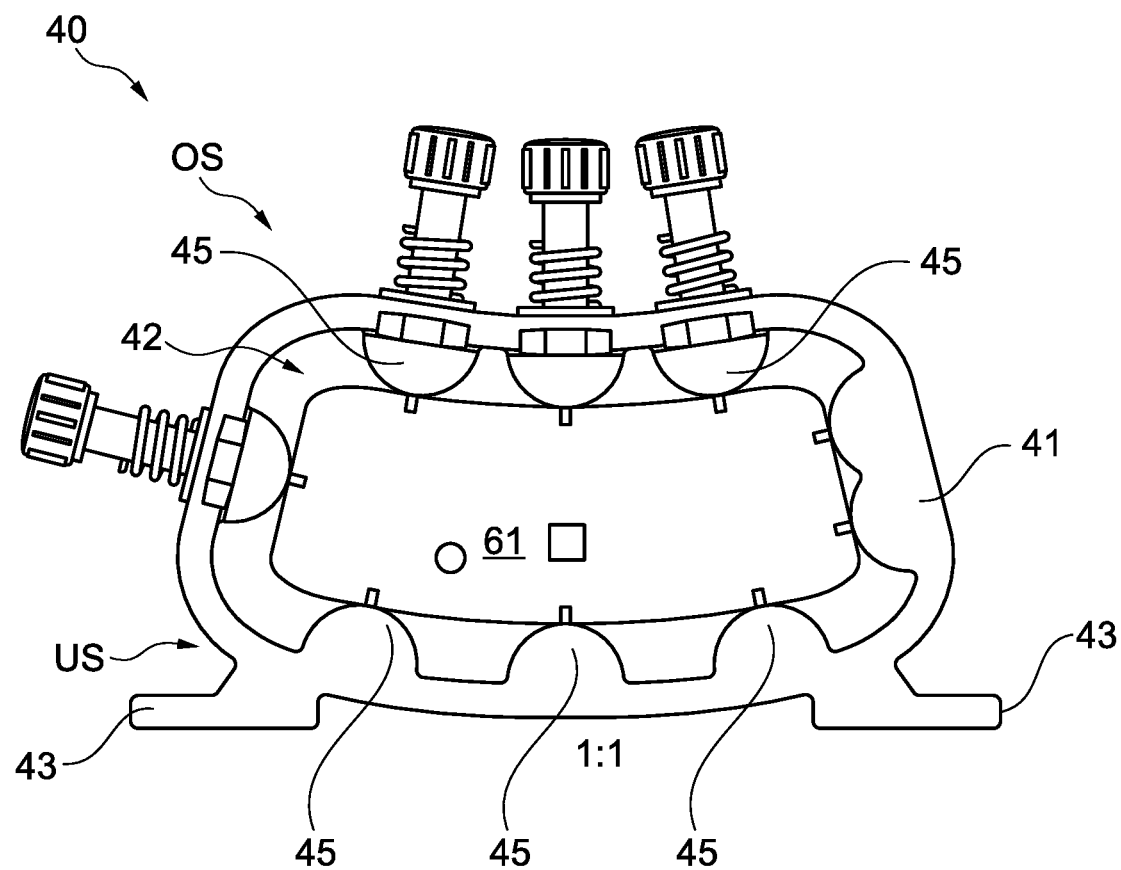
FIG. 3a shows a view an alternative embodiment of a detached guiding-and-holding body.
Figure 3B:
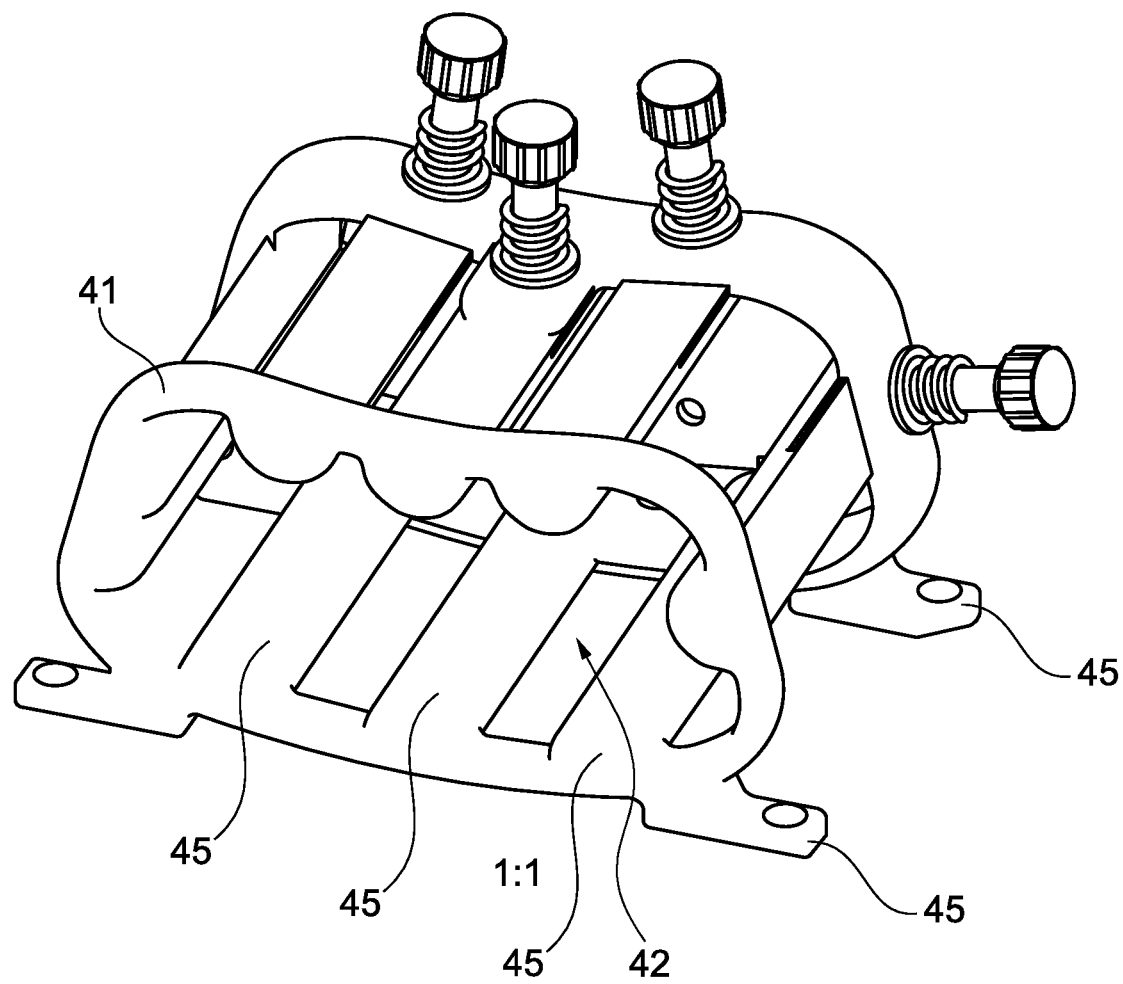

In some embodiments, such as those shown in FIGS. 3a and 3b, the guide region FA itself forms the guide 45. In such embodiments, the guide 45 and the guiding-and-holding body 41 form two parts of a single monolithic structure. This facilitates the manufacture thereof using an additive manufacturing process.

In those embodiments in which the guiding-and-holding body 41 comprises several guides 45, it is useful for at least one of the guides 45 to be made from an elastically-deformable material and/or to be elastically connected by one end thereof to the guiding-and-holding body 41.

In some embodiments, it is advantageous to arrange the guide at the guiding-and-holding body 41 in such a way that the guide's first end, though mechanically secured to the guiding-and-holding body 41, remains elastically movable. In this arrangement, the guide's second end, which opposes its first end, remains unsecured to the guiding-and-holding body 41. The first end is thus a "fixed end" and the second end is a "loose end."

In the foregoing arrangement, it is useful for the setting screw 47 to be near the guide's loose end. This enables the setting screw 47 to be used for adjusting the distance between the labels' contour and the guide element 45. In this embodiment, the guide element 45 is configured as an elastically-connected tongue that can be adjusted to the labels' contour.

Figure 4:
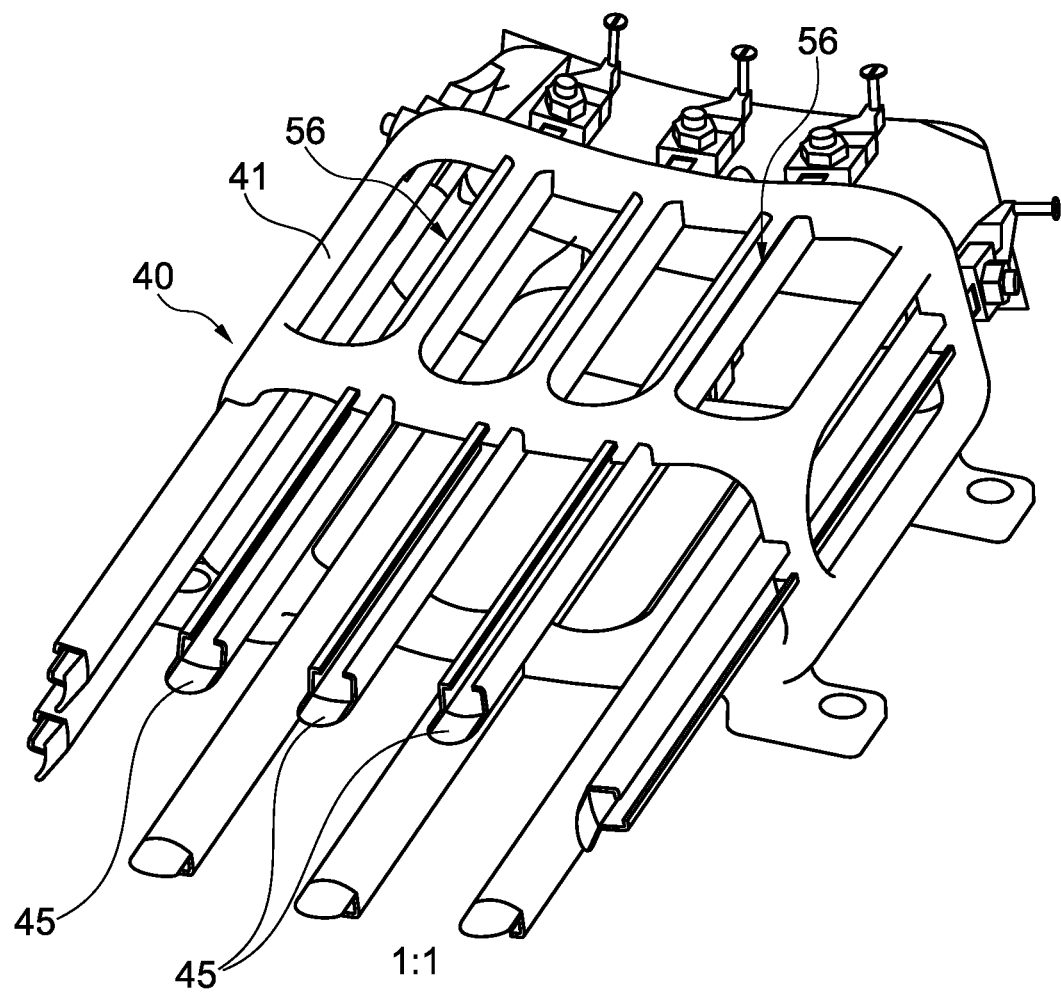
FIG. 4 is a perspective view of a further embodiment of a detached guiding-and-holding body.

FIG. 4 shows an embodiment having a receiver 56 for receiving the guide 45 into the guiding-and-holding body 41. Preferably, the receiver 56 is provided in the wall or as a wall section of the guiding-and-holding body 41 and produced by the additive manufacturing process.

Figure 5A:
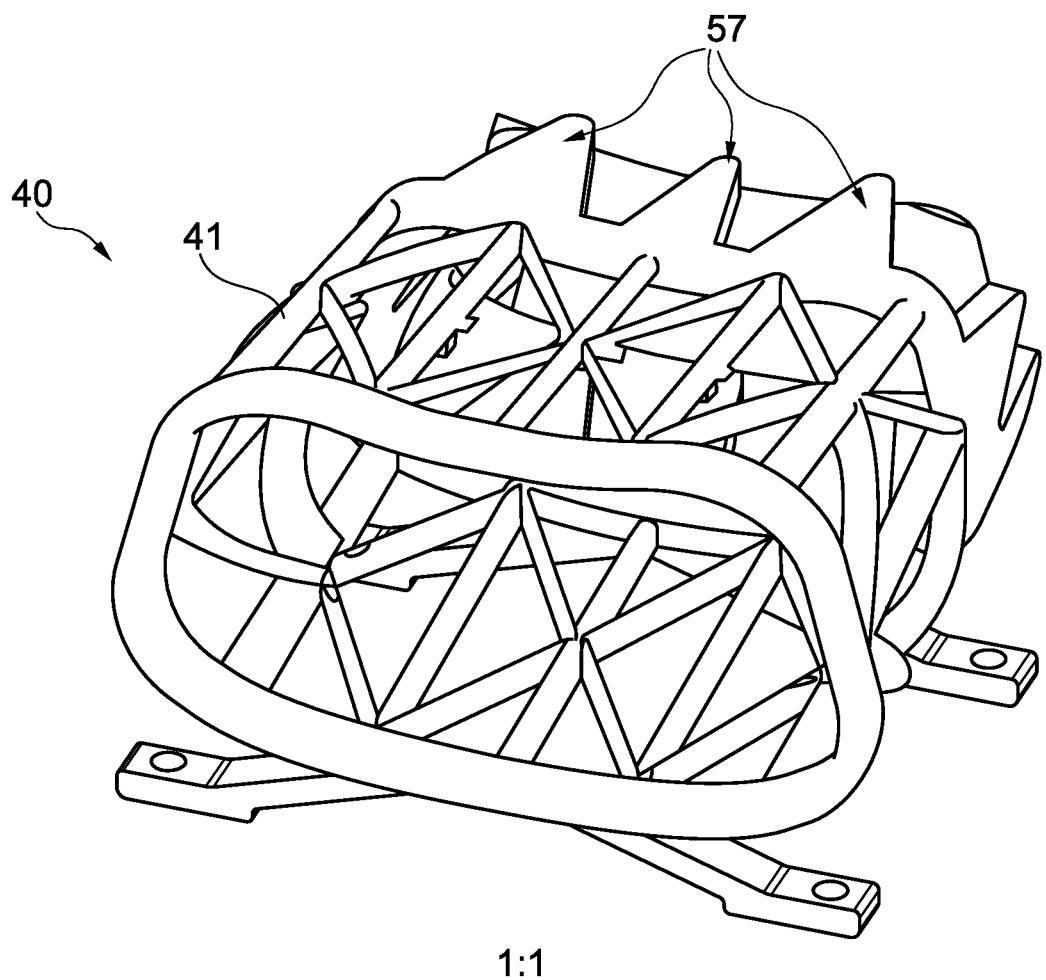
FIG. 5a is a perspective view of a further embodiment of a detached guiding-and-holding body.
Figure 5B:
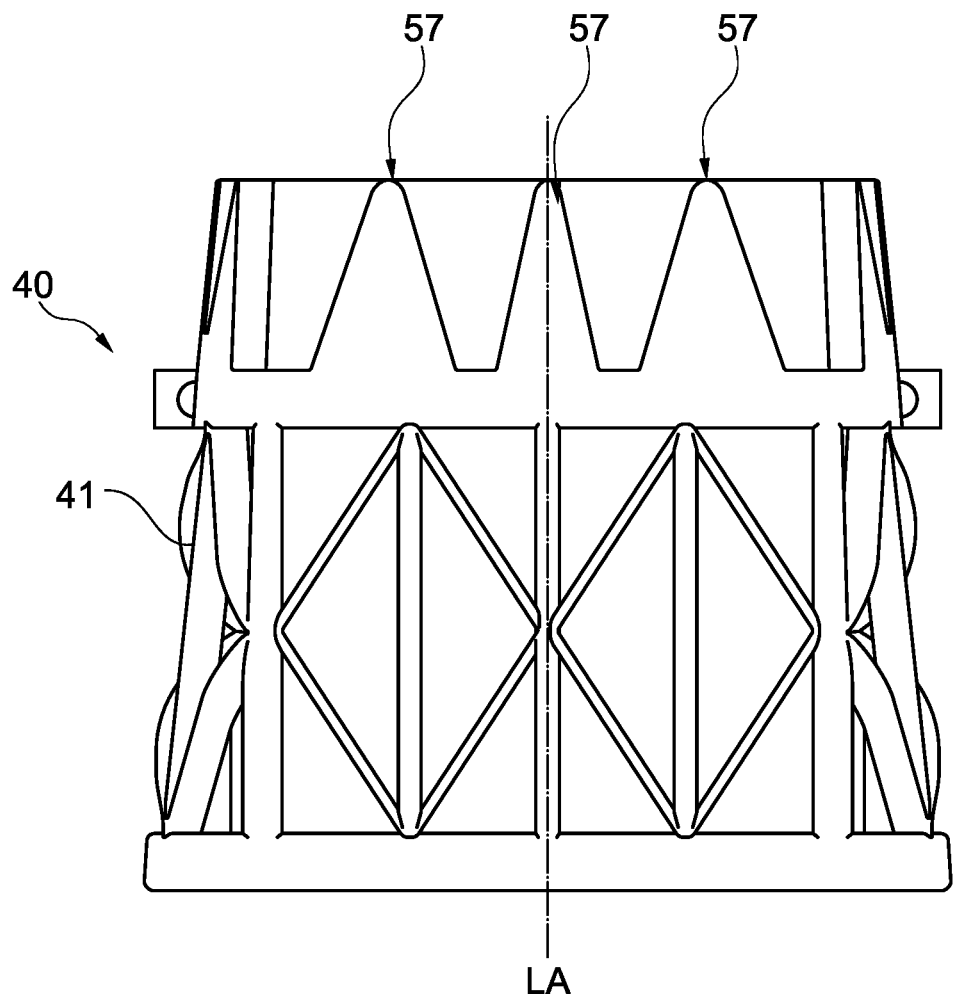

In the illustrated embodiment, the receiver 56 has a T-shaped cross-section with the axis of the "T" extending along the box's longitudinal axis LA, which can be seen in FIG. 5b. In this embodiment, it is particularly useful for the guide 45 to formed as a guide rail that can be simply be clipped on.

The guide section FA of the guiding-and-holding body 41 comprises several guides 45 that extend along the longitudinal axis LA of the label box 100. These guides 45 are disposed at intervals along the perimeter that bounds free guide space 42 and around the two-dimensional contour of the individual label 61. Preferably, the individual guides 45 extend parallel to one another as well as parallel to the longitudinal axis LA, for example as a guide strip extending along the longitudinal axis LA.

In some embodiments, the guiding-and-holding body 41 and the guide 45 are formed from different materials using the additive manufacturing process. Among these are embodiments in which the different materials have different material characteristics. Such differences include differences in elasticity, hardness, damping, and wear characteristics. In some embodiments, the guide 45 is made from a material that is harder and less prone to wear than the guiding-and-holding body 41. In some embodiments, the additive manufacturing process produces a guiding-and-holding body 41 from a material which is more elastic than that used for the guide section FA.

In some embodiments, the different materials have different colors. This makes it possible to have a wear layer on a guide 45. As a result, as the guide 45 becomes worn, it is possibly to spot the worn guide 45 by observing a color change.

FIGS. 5a and 5b shown a further embodiment in which the label box 100 comprises a guiding-and-holding body 41 having a tapered guide region FA that extends away from the storage region 50 along the longitudinal axis LA. Embodiments in include those in which the tapered guide region FA defines a cone or a trapezoid. In such embodiments, it is useful to form several retaining fingers 57 on a free-face side of the guiding-and-holding body 41 at the end that lies opposite from the storage region 60. These provide a way to retain individual labels 61 of the label stack 60. It is particularly advantageous for the retaining fingers 57 to be formed as one piece so that the guiding-and-holding body 41 and the fingers 57 form a single monolithic structure. This is achieved by using the additive manufacturing process.

Figure 2B:
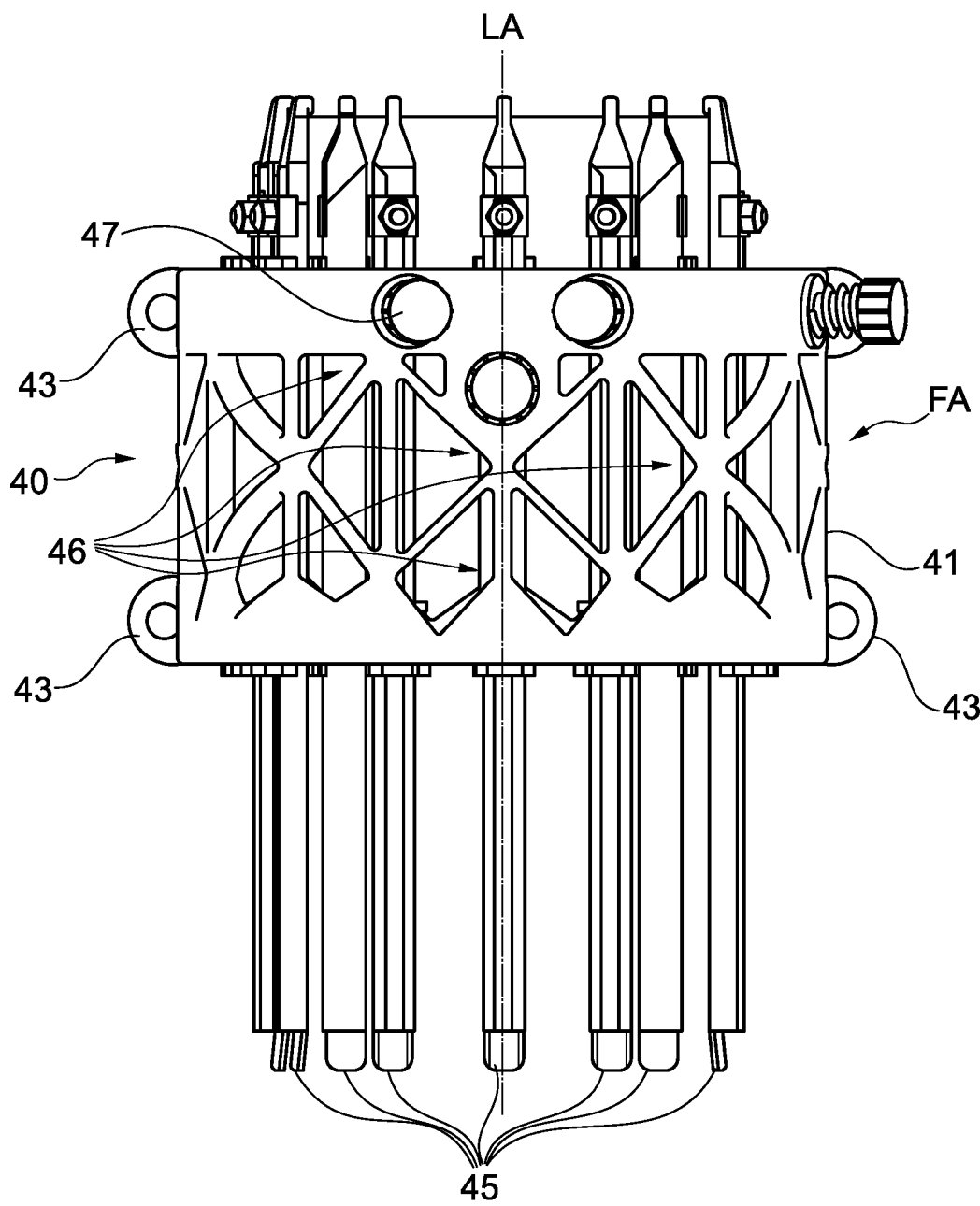

As shown in FIG. 2b, the guiding-and-holding body 41 comprises several openings 46 through its wall. The total area of these openings 46, when divided by what the surface area of the guiding-and-holding body 41 would have been in the absence of such openings 46, defines a "surface proportion." Preferably, the surface proportion of the openings 45 is at least 20%. In some embodiments, the surface proportion is more than 30%. In particularly useful embodiments, the surface proportion is as much as 50%.

The openings 46 are configured in such a way that the guiding-and-holding body 41 defines a rod-shaped lattice. This economizes on material while also providing a stable structure with high mechanical strength. Such a form is one that is manufacturable by using the additive manufacturing process.

Figure 6A:
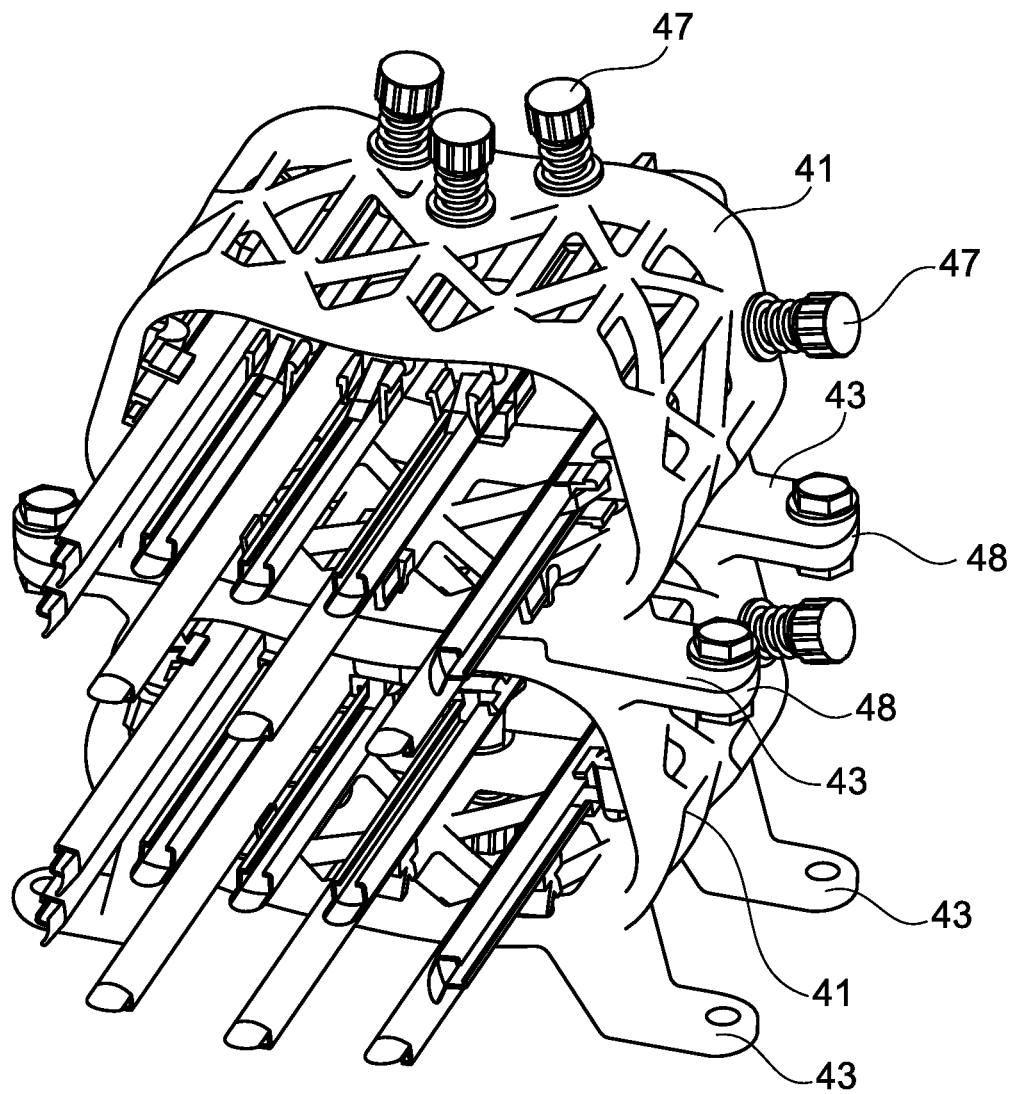
FIG. 6a is a perspective view of a further embodiment of a detached guiding-and-holding body.
Figure 6B:
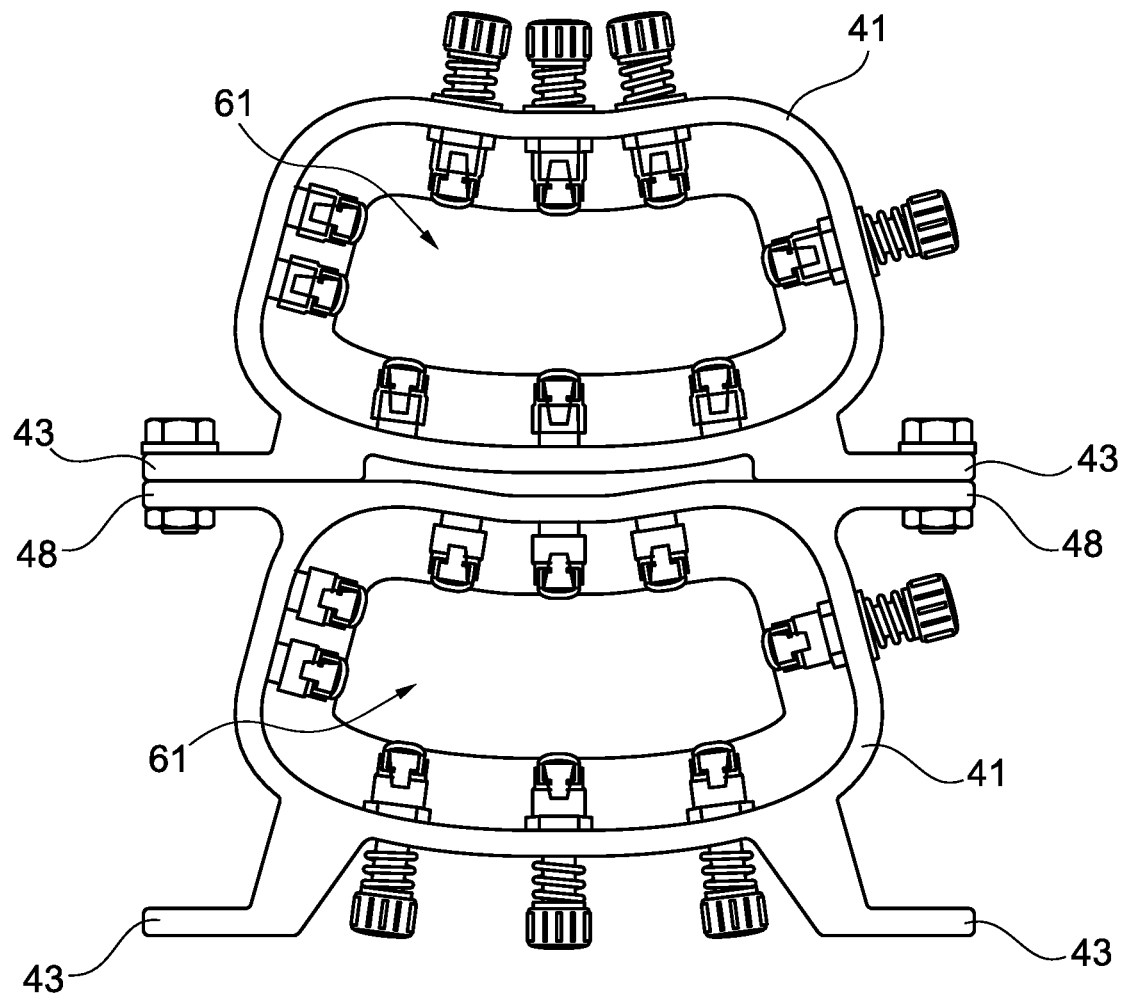

As shown in FIG. 2a, the guiding-and-holding body's underside US includes a securing region 43 that is used in connection with securing the label box 100 to a holding device 8. This can be carried out by screwing, locking, or clamping the securing region 43 to the holding device 8. As shown in FIGS. 6a and 6b, the securing region 43 can also be used to secure the label box 100 to a further label box 100'.

In a preferred embodiment, the securing region 43 is on the underside US of the guiding-and-holding body 41. In some of these embodiments, the securing region 43 and the guiding-and-holding body 41 form a single monolithic structure that has been produced by additive manufacturing. In such embodiments, it is useful to have the securing region 43 comprise an aperture such as a borehole to accommodate a suitable fastener. Also among the embodiments are those in which there securing regions 41 are organized into a front pair and a rear pair as shown in FIG. 6a. Preferably, all securing regions 43 and the guiding-and-holding body 41 form a single monolithic or unitary structure that is formed by additive manufacturing.

In other embodiments, the guiding-and-holding body 41 of a first label box 100 includes, on an upper side OS thereof, a receiving region 48 by which a second label box 100', or at least of its further guiding-and-holding body 41', is secured. This forms a "double-decker" label box, as seen in FIGS. 6a and 6b).

Figure 7:
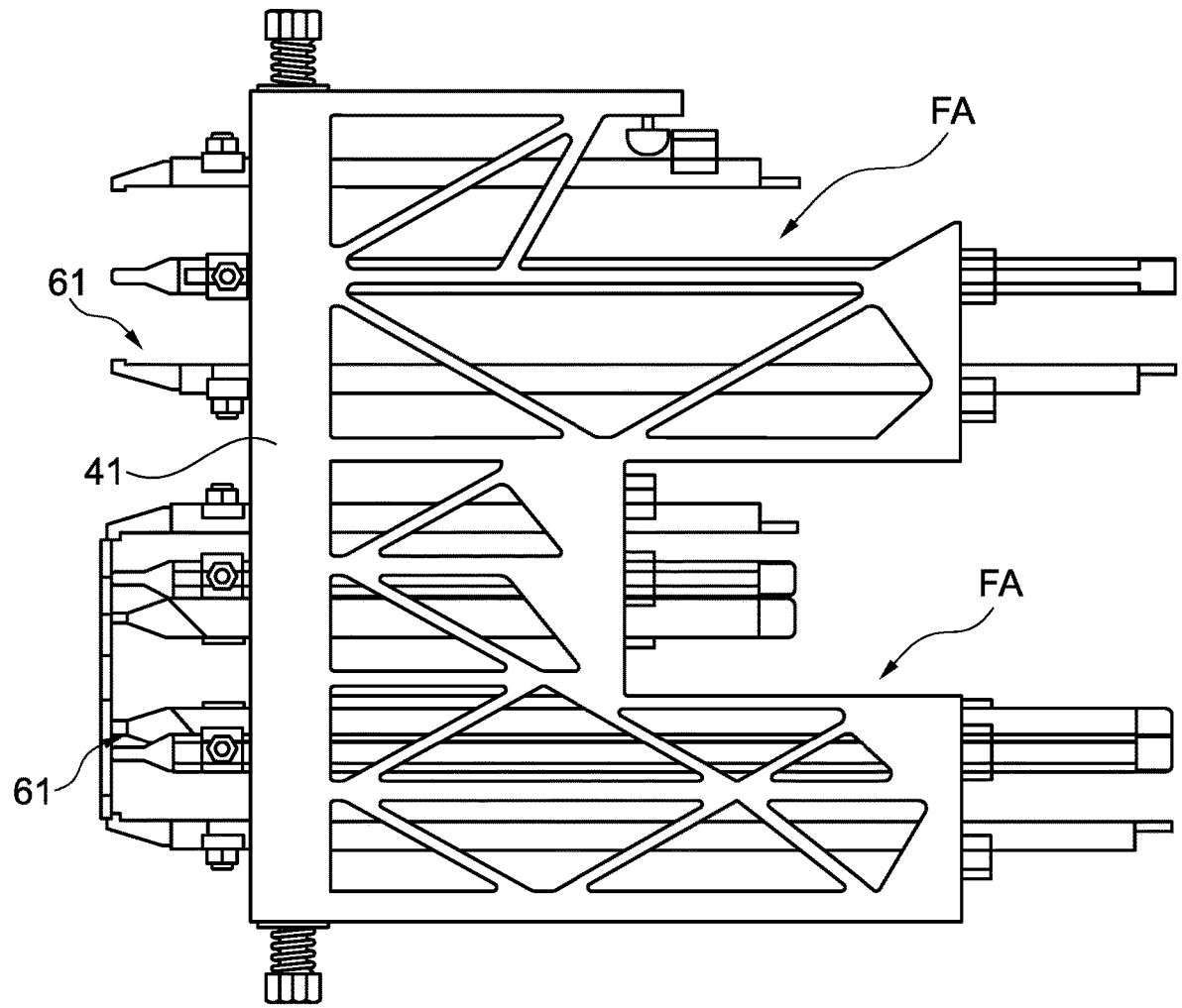
FIG. 7 is a side view of a further embodiment of a detached guiding-and-holding body.

In the embodiment shown in FIG. 7, the label box 100 comprises a double-deck guiding-and-holding body 41 that receives two stacks 60 of labels. In a preferred embodiment, the double-deck guiding-and-holding body 41 is a monolithic structure formed by additive manufacturing.

In some embodiments, the receiving region 48 is formed on the upper side OS of the guiding-and-holding body 41. Among these are embodiments in which the receiving region 48 and h the guiding-and-holding body 41 are formed as a single monolithic structure by additive manufacturing.

Still other embodiments include those that have front and rear pairs of receiving regions 48 on opposite sides of the upper side OS. Among these are embodiments in which the front and two rear receiving regions 48 and the guiding-and-holding body 41 form a single monolithic structure formed by additive manufacturing.

Some embodiments, as shown in FIG. 2a, feature a shim 49 having a thickness "D" that is selected or adjusted to choose the height of a label's midpoint as it is taken from the stack 60. This permits the relative position of a label's mid-point to be adjusted to the holding device 8. The holding device 8 forms a fixed-position contact point for the guiding-and-holding body 41 whose height cannot be changed. In some embodiments, the shim 49 is formed between the securing region 43 and the guiding-and-holding body 41.

In a preferred embodiment, the shim 49 and the guiding-and-holding body 41 form a monolithic structure that has been manufactured using an additive manufacturing process.

Figure 2C:
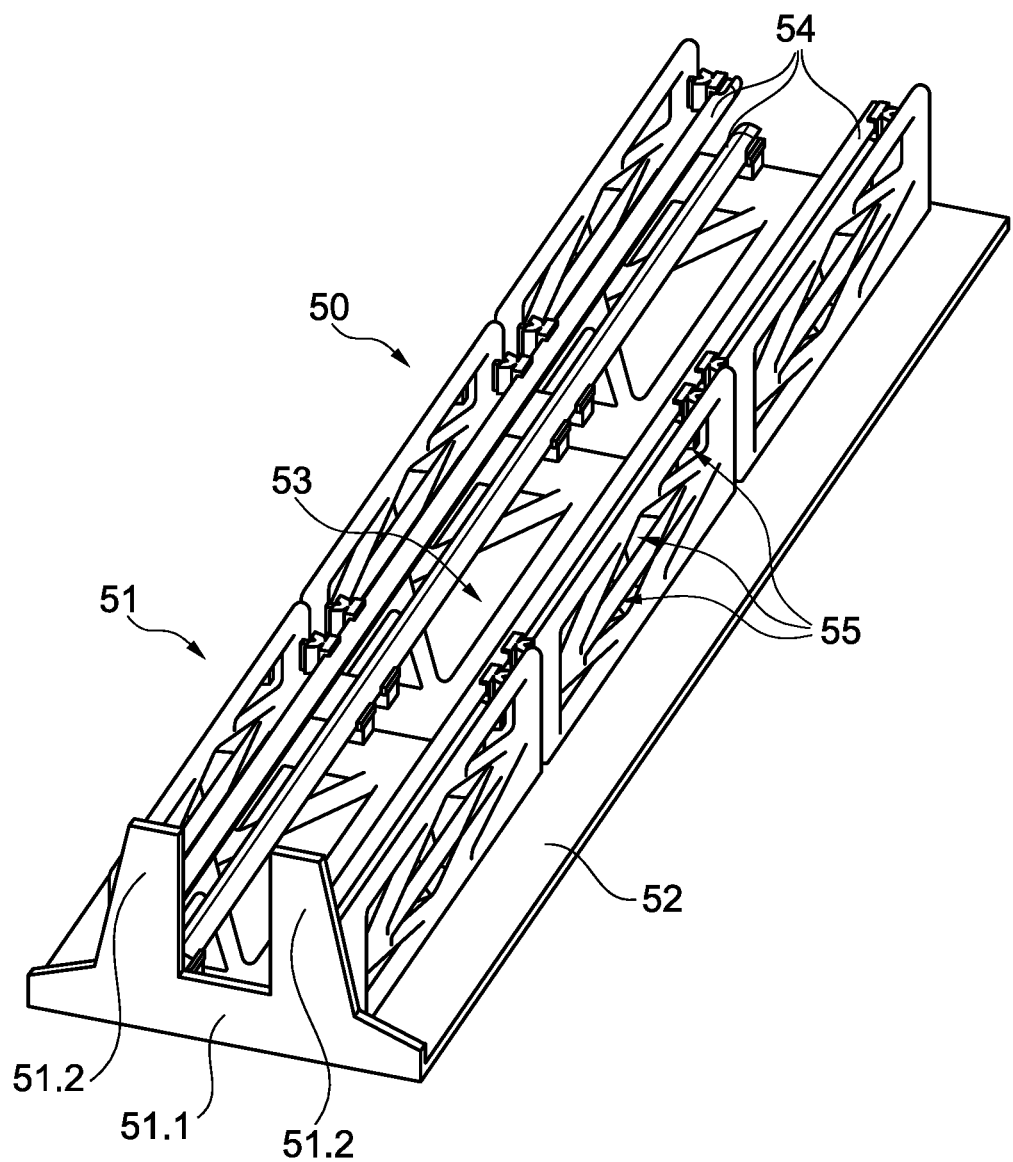
FIG. 2c shows a detached storage region.

In an embodiment shown in FIG. 2c, the label box 100 comprises a label trough 51 in the storage region 50. The label trough 51 is likewise secured by the holding device 9 using a securing region 52. This provides a way to secure the label box 100 to a holding device 9, which is configured as a base carrier or support structure, by screwing, locking, or clamping. In some embodiments, the label trough 51 is a monolithic structure formed by an additive manufacturing process.

As can be seen in FIG. 2c, the label trough 51 further comprises a take-up section 53 that extends along the longitudinal axis LA of the label box 100 and that opens upwards. The take-up section 53 provides a place for storing the stack 60 of labels. As can be seen in the figure, the take-up section 53 has an essentially U-shaped cross-section.

Guides 54 along the label trough's underside 51.1 and side sections 51.2 extend along the longitudinal axis LA. In some embodiments, the guides 54 are configured as separate guide rails that have been secured to the underside 51.1 and/or to the side sections 51.2. In other embodiments, the guides 54 and the label trough 51 form a single monolithic structure that gas been manufactured using an additive manufacturing process. In either case, these guides 54 guide the individual labels 61 from the label stack 60 in the receiving region 53 by constraining them along their edges. Embodiments include those in which the label trough 51 is formed as one monolithic piece by an additive manufacturing process that uses one or more materials. These different materials have different material properties, including elasticity, hardness, damping, and/or wear characteristics. Among the embodiments are those in which the guide 54 is produced from a material that is harder and less subject to wear than the label trough 51.

In some embodiments, the label trough 51 includes openings 55 through its wall, and in particular, through its underside 51.1 and/or side sections 51.2. The total area of these openings 55, when divided by what the surface area of the label trough 51 would have been in the absence of such openings 55, defines a "surface proportion." Preferably, the surface proportion of the openings 55 is at least 20%. In some embodiments, the surface proportion is more than 30%. In particularly useful embodiments, the surface proportion is as much as 50%.

The openings 55 are configured in such a way that the guiding-label trough 51 defines a rod-shaped lattice. This economizes on material while also providing a stable structure with high mechanical strength. Such a form is one that is manufacturable by using the additive manufacturing process.

Figure 8:
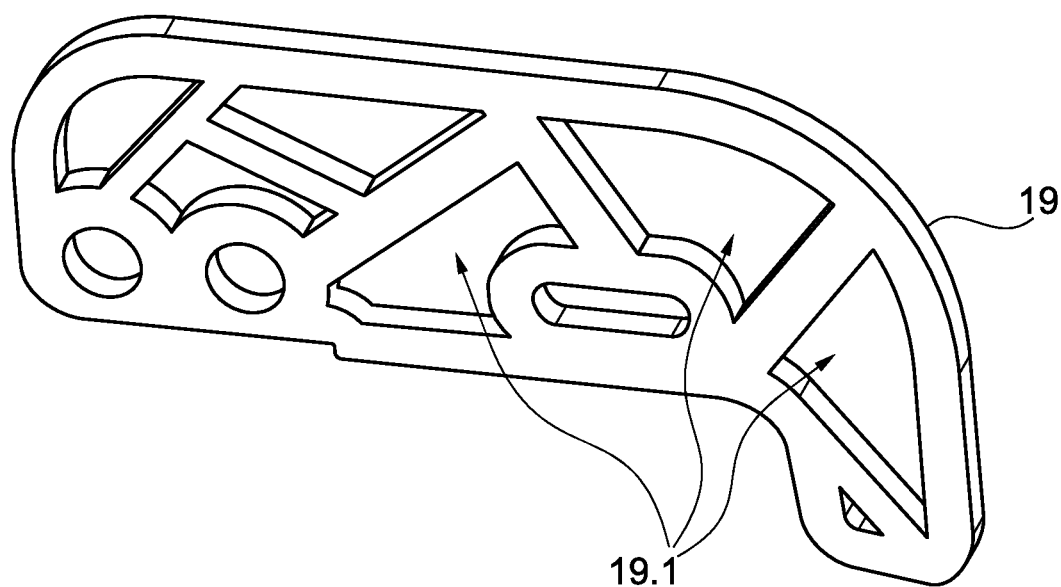
FIG. 8 is a perspective view of a detached slide element.

A slide element 19, which is shown in FIG. 1 and in more detail in FIG. 8, imposes pressure on the stack 60 from its rear side. The slide element 18 is near the trough 51 and guided on guide rails 20 that are on either side of the trough 51. A drive 21 drives cables that move the slide element 19. The guide rails 20 and the drive 21 are mounted on the support structure 9 such that all these elements form a structural unit that can be mounted onto columns 11, 12 carried by a pedestal 22, which in turn is clamped securely to rails.

In some embodiments, the slide element 19 is formed by an additive manufacturing process. Preferably, the slide element 19 comprises openings 19.1 to form a lattice that reduces weight and material costs.

Figure 9:
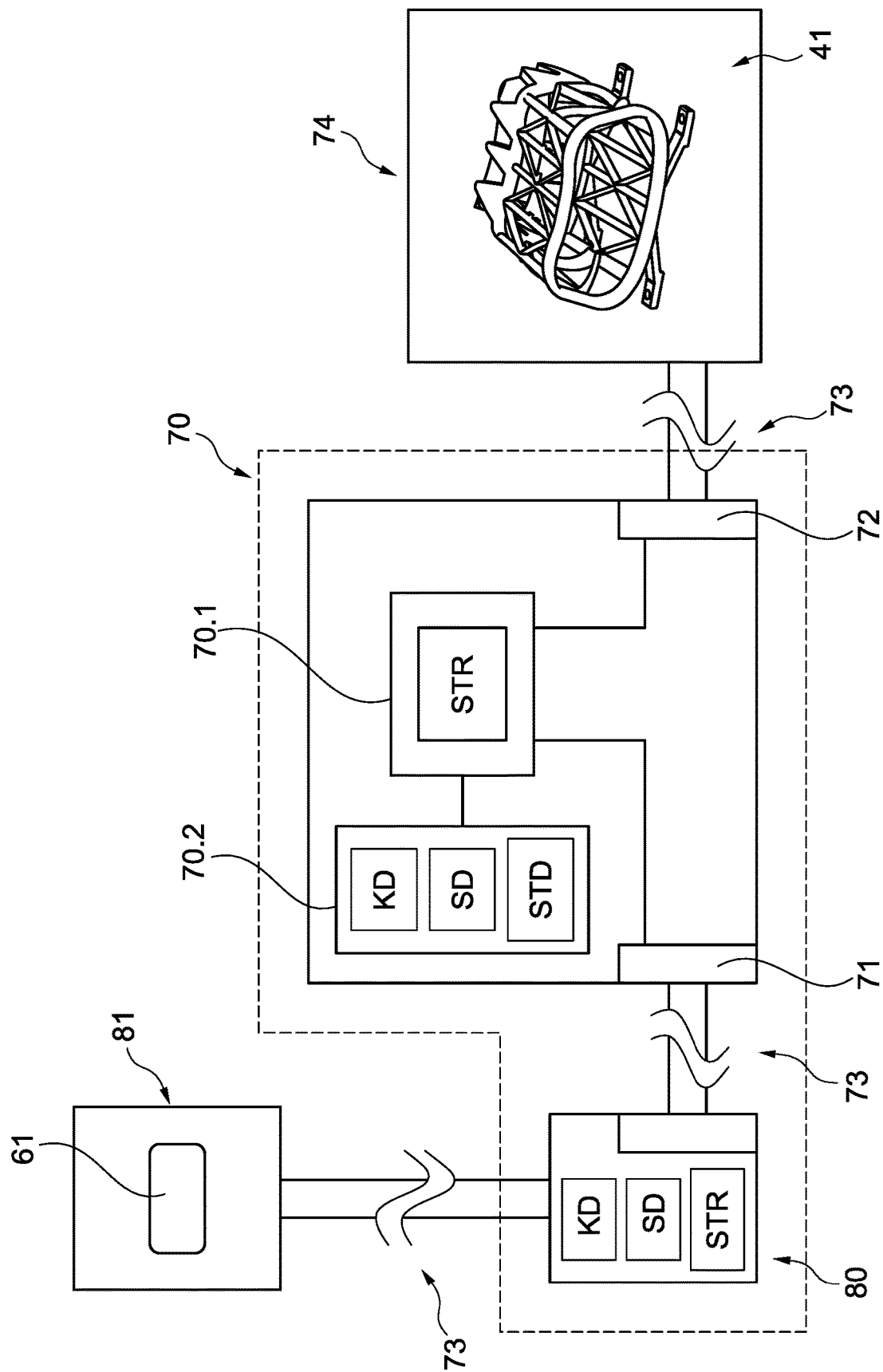
FIG. 9 is a block diagram of a control unit for carrying out a control routine for manufacturing the guiding-and-holding body.

FIG. 9 shows a block diagram of a control unit 70 for carrying out a control routine STR for causing a printer 74 to produce the label box 100. The control unit 70 relies on a two-dimensional model that is prepared from contour data KD that represents the contour of a label 61.

In some embodiments, an imaging unit detects a label's contour data KD. Examples of an imaging unit include a scanner or a camera. A computer 80 uses the contour data KD to build a two-dimensional model of the label 61.

Embodiments include those in which the computer 80 is a stand-alone computer and those in which the computer 80 is integrated into the control unit 70, in which case the control unit 70 comprises the computer 80. In alternative embodiments, the contour data KD has been previously stored on a data-storage medium in any of a variety of different data formats, such as structural design data or image data.

The control unit 70 uses a three-dimensional computer model of the guiding-and-holding body 41 to create a three-dimensional control data set SD that a control routine STR uses to control the additive-manufacturing printer 74.

In some embodiments, the computer 80 produces the dimensional computer model of the guiding-and-holding body 41 from the contour data KD. Embodiments include those in which the computer 80 is personal computer, those in which it is a laptop, and those in which it is a tablet.

Embodiments include those in which the computer 80 produces the three-dimensional computer model and those in which it produces the three-dimensional control data set SD that is to be carried out by a control routine in the control unit 70.

Embodiments include those in which a user of the computer 80 carries out the production of the three-dimensional computer model, those in which production thereof is software-based and/or at least partially automated, and those in which such production is fully automated.

In other embodiments, a program stored on the computer 80 produces the three-dimensional computer model of the guiding-and-holding body 41. In such cases, software, such as structural-design software, enables the computer 80 to carry out production of the three-dimensional computer model of the guiding-and-holding body.

Typically, a display 81 connects to the computer 80 or is integrated into the computer 80. Such a display 81 is configured for the display of two-dimensional and/or three-dimensional graphic objects, including two-dimensional model of the individual label 61 and the three-dimensional computer model of the guiding-and-holding body 41.

In some embodiments, the contour data KD is stored in a design structure databank deposited in the computer 80 and the three-dimensional computer model is produced from the contour data KD.

In particular, the three-dimensional computer model 3D-CM at least of the guiding-and-holding body 41 can be generated by the computer unit 80 in such a way that the longitudinal extension of the guiding-and-holding body 41 along the longitudinal axis LA is adjusted, software-based and automated, to the number of the individual labels 61 of the label stack 60, i.e. to the length of the label stack 60. In other words, therefore, an adjustment takes place of the depth of the guide section FA to the length of the label stack 60.

In this situation, the graphic objects of the two-dimensional model of the contour of the individual label 61, as well as the three-dimensional computer model, in particular as models with a resolution of at least 1200 dpi, are deposited in the structural design databank, and are displayed by the display unit 81.

In addition to this, the computer unit 80 is configured, based on the three-dimensional computer model, so as to generate the three-dimensional control data set SD for a control routine STR which can be run in the control unit 70, for actuating a 3D printer 74.

For this purpose, the control unit 70 comprises at least one processor unit 70.1 for carrying out the control routine STR, a storage unit 70.2, interacting with the processor unit 70.1, for the at least temporary storage of process parameters and/or of the control data set SD and/or of the three-dimensional control data STD, comprising the control data set SD, as well as a first and second interface 71, 72.

In this situation, the control data set SD contains a series of control instructions, wherein the control instructions are configured in such a way that, when implemented on a 3D printer 74, they cause the 3D printer 74 to print a label box 100, comprising at least one dispensing region 40 and a storage region 50 for holding at least one label stack 61 formed from individual labels 60.

The processor unit 70.1 is configured to convert the control data set SD received at the first interface 71 of the control unit 70, by the control routine STR, into three-dimensional control data STD, or to define control commands, which can be transferred via the second interface 72 to the 3D printer 74, in order to actuate it based on the control data SD generated by the control routine STR, or to actuate control commands. The 3D printer 74 is actuated based on the control routine STR carried out in the control unit 70, on the basis of the three-dimensional control data STD, and at least the guiding-and-holding body 41 is printed as a 3D printed product by the 3D printer actuated in such a way.

A wireless or wire-bound data transfer stretch 73 permits transfer of the control data STD or of control commands between the second interface 72 and the 3D printer 74. The first interface 71 is likewise in connection, via a data transfer stretch 73 for transferring the control data set SD, with the computer unit 80, which can be configured, for example, as a personal computer, laptop, or tablet.

The invention has been described heretofore by way of exemplary embodiments. It is understood that a large number of modifications or derivations are possible, without thereby departing from the scope of protection of the invention as defined by the claims.

The invention claimed is:

1. A method comprising manufacturing a label box (100) that has both a dispensing region and a storage region, wherein said storage region holds a stack of individual labels, wherein each of said labels has a contour, wherein said dispensing region comprises a guiding-and-holding body that forms a guide space for receiving and guiding said label stack and for dispensing individual labels from said label stack, wherein said guide space adjusts, at least in sections, to said contour, wherein said guiding-and-holding body comprises: a securing region that secures said label box to a holding device and a guide section that engages said labels around said contours thereof and guides said labels, and a guide element arranged at said guide section, wherein manufacturing said label box comprises preparing a two-dimensional model of said contour from contour data representing an individual label in said stack, starting from said contour data, producing a three-dimensional computer model of said guiding-and-holding body, based on said model, generating a three-dimensional control data set for a control routine that is to be executed by a control unit for actuating a printer for use in an additive manufacturing process, actuating said printer based on said control routine, and using at least said printer, carrying out said additive manufacturing process that results in manufacture of said guiding-and-holding body and said guide element, said guide element being monolithic with said guiding-and-holding body at said guide section.

2. The method of claim 1, wherein said securing region is one of a plurality of securing regions that are organized into a front pair of securing regions and a rear pair of securing regions.

3. The method of claim 1, wherein said securing region screws, locks, or clamps said label box to said holding device.

4. The method of claim 1, wherein preparing a two-dimensional model of said contour from contour data representing an individual label in said stack comprises using an imaging unit to detect said label's contour data and providing said contour data to a computer that uses said contour data to build said two-dimensional model of said label.

5. The method of claim 1, wherein preparing a two-dimensional model of said contour from contour data representing an individual label in said stack comprises retrieving said contour data and providing said retrieved contour data to a computer that uses said contour data to build said two-dimensional model of said label.

6. The method of claim 1, wherein said guide element is elastically-deformable.

7. The method of claim 1, wherein said guide element (45) comprises a first end and a second end that is opposite said first end, wherein said first end is connected to said guiding-and-holding body, wherein said first end is configured to move elastically, and wherein said second end remains loose.

8. The method of claim 1, wherein carrying out said additive manufacturing process further comprises manufacturing a set screw at a loose end of said guide element, wherein said guide element has a fixed end that is fixed to said guiding-and-holding body, wherein said set screw adjusts a distance between said guide element and said labels' contour.

9. The method of claim 1, wherein carrying out said additive manufacturing process comprises using additive manufacturing to manufacture a receiver in a wall of said guiding-and-holding body for receiving said guide element in said guiding-and-holding body, said receiver having been manufactured by said additive manufacturing process.

10. The method of claim 1, wherein carrying out said additive manufacturing process comprises using a first material to manufacture said guiding-and-holding body and using a second material to manufacture the guide element.

11. The method of claim 1, wherein carrying out said additive manufacturing process comprises manufacturing said guide section such that said guide section tapers from said storage region along a longitudinal axis thereof, wherein said guide section defines a cone or a trapezoid, and wherein carrying out said additive manufacturing process further comprises manufacturing retaining fingers that are integral with said guiding-and-holding body on a free face that is opposite said storage region.

12. The method of claim 1, wherein carrying out said additive manufacturing process comprises forming openings on said guiding-and-holding body and forming a rod-shaped structure that comprises said guiding-and-holding body.

13. The method of claim 1, wherein carrying out said additive manufacturing process comprises forming said securing region for at least partially securing said label box to said holding device such that said securing region is disposed at an underside of said guiding-and-holding body and such that said securing region and said guiding-and-holding body are produced as a single piece using said additive manufacturing process.

14. The method of claim 1, wherein carrying out said additive manufacturing process comprises manufacturing, at an upper side of said guiding-and-holding body, a receiving region for securing a further label box to said guiding-and-holding body, wherein said guiding-and-holding body and said receiving region are integral with each other.

15. The method of claim 1, wherein said stack of individual labels is a first stack of individual labels and wherein carrying out said additive manufacturing process comprises manufacturing a double-decker body that receives and laterally guides labels from said first stack of individual labels and labels from a second stack of individual labels that is arranged above said first stack, and wherein said guiding-and-holding body dispenses individual labels from both said first stack of individual labels and said second stack of individual labels.

16. The method of claim 1, wherein carrying out said additive manufacturing process further comprises forming a shim on an underside of said guiding-and-holding body between said securing region and said guiding-and-holding body, said shim having a thickness that is set by said additive manufacturing process.

17. The method of claim 1, wherein carrying out said additive manufacturing process comprises forming a label trough in said storage region.

18. The method of claim 1, wherein said guide space adjusts in response to application of force by screws.

19. The method of claim 1, wherein said securing device secures said label box to a further label box.

20. The method of claim 1, wherein said securing region is on an underside of said guiding-and-holding body and said securing region and said guiding-and-holding body form a single monolithic structure, wherein said securing region comprises a bore hole to accommodate a fastener.

21. The method of claim 1, wherein said dispensing region and the storage region are formed as a single unit.

22. The method of claim 1, wherein said dispensing region and the storage region are individual units that have been joined together.

23. The method of claim 1, wherein said storage region comprises a label trough that is secured to the holding device using the securing region, wherein said label trough comprises a take-up section that extends along a longitudinal axis of said label box for storing said stack of labels.

\* \* \* \* \*